United States Patent
Li et al.

(10) Patent No.: US 8,654,759 B2
(45) Date of Patent: Feb. 18, 2014

(54) LOOP CONDITION PREVENTION AT INTERNETWORK INTERFACE BOUNDARY

(75) Inventors: Xuewen Li, Cary, NC (US); Carroll Louise Gray-Preston, Morrisville, NC (US); James McEachern, Stittsville (CA)

(73) Assignee: Genband US LLC, Plano, TX (US)

( * ) Notice: Subject to any disclaimer, the term of this patent is extended or adjusted under 35 U.S.C. 154(b) by 288 days.

(21) Appl. No.: 13/131,590

(22) PCT Filed: Dec. 1, 2009

(86) PCT No.: PCT/US2009/006323
§ 371 (c)(1),
(2), (4) Date: May 26, 2011

(87) PCT Pub. No.: WO2010/065093
PCT Pub. Date: Jun. 10, 2010

(65) Prior Publication Data
US 2011/0228766 A1 Sep. 22, 2011

Related U.S. Application Data

(60) Provisional application No. 61/119,959, filed on Dec. 4, 2008.

(51) Int. Cl.
*H04L 12/66* (2006.01)
*H04J 3/16* (2006.01)
(52) U.S. Cl.
USPC .......................................... 370/352; 370/466
(58) Field of Classification Search
None
See application file for complete search history.

(56) References Cited

U.S. PATENT DOCUMENTS

| 7,672,680 | B1 * | 3/2010 | Lee et al. ................... 455/456.5 |
| 8,184,590 | B2 * | 5/2012 | Rosenblatt ................... 370/331 |
| 2004/0233855 | A1 | 11/2004 | Gutierrez et al. |
| 2007/0177603 | A1 * | 8/2007 | Calme et al. ............... 370/395.2 |
| 2008/0239943 | A1 | 10/2008 | Hauenstein et al. |
| 2008/0240115 | A1 | 10/2008 | Briscoe et al. |

OTHER PUBLICATIONS

Camarillo et al., "Integrated Services Digital Network (ISDN) User Part (ISUP) to Session Initiation Protocol (SIP) Mapping," RFC 3398, pp. 1-69 (Dec. 2002).
Rosenberg et al., "SIP: Session Initiation Protocol," RFC 3261, pp. 1-269 (Jun. 2002).

(Continued)

*Primary Examiner* — Hassan Phillips
*Assistant Examiner* — Hicham Foud
(74) *Attorney, Agent, or Firm* — Haynes and Boone, LLP

(57) ABSTRACT

The present invention provides a solution to maximize the chance of completion for an ISUP to SIP direction call by enabling a bigger factor for converting ISUP hop counter to SIP Max-Forwards value than the reverse direction thus enabling more hops in the SIP network. Enabling a bigger factor for ISUP to SIP direction can cause loops without special considerations. This invention provides an algorithm that prevents a "loop condition" that can arise at the interface boundary of two telephone networks, known by their standard names ISUP and SIP networks. The present invention solves the "loop condition" problem by adjusting the Hop Counter and Max-Forward parameter values in a predetermined manner such that the adjusted parameter values break the cycle of providing the same parameter values between networks at the network boundary for an uncompleted connection, or break an endless "loop condition".

25 Claims, 2 Drawing Sheets

(56) References Cited

OTHER PUBLICATIONS

"Application of the ISDN User Part of CCITT Signalling System No. 7 for International ISDN Interconnections," ITU-T, Q.767, pp. 1-273 (Feb. 1991).

Notification of Transmittal of the International Search Report and the Written Opinion of the International Searching Authority, or the Declaration for International Application No. PCT/US09/06323 (Jan. 28, 2010).

* cited by examiner

LOOP CONDITION PREVENTION AT INTERNETWORK INTERFACE BOUNDARY

CROSS-REFERENCE TO RELATED APPLICATIONS

This application is related to Provisional Patent Application Ser. No. 61/119,959 filed on Dec. 4, 2008, and priority is claimed for this earlier filing under 35 U.S.C. §119(e). The Provisional patent application is also incorporated by reference into this utility patent application.

TECHNICAL FIELD OF THE INVENTION

This application relates to technique and system for prevention of a loop condition at a telephone internetwork (ISUP/SIP) interface boundary.

BACKGROUND OF THE INVENTION

Telephone systems and IP-based mobile systems provide for communication between telephone units, including the use of mobile user equipment on wireless communication networks. Among other elements, the transition of connectivity from one communication network to another network usually involves a transition of communication services. The user equipment, source network, and target network may be called different names depending on the nomenclature used and the base technology used in the particular network configurations or communication systems.

An IP-based mobile system includes at least one mobile node on a wireless communication system. A "mobile node" is sometimes referred to as user equipment, mobile unit, mobile terminal, mobile device, or similar names depending on the nomenclature adopted by particular system providers. The various components on the system may be called different names depending on the nomenclature used on any particular network configuration or communication system.

For instance, "mobile node" or "user equipment" encompasses PC's having cabled (e.g., telephone line ("twisted pair"), Ethernet cable, optical cable, and so on) connectivity to the wireless network, as well as wireless connectivity directly to the cellular network, as can be experienced by various makes and models of mobile terminals ("cell phones") having various features and functionality, such as Internet access, e-mail, messaging services, and the like. The term "mobile node" also includes a mobile communication unit (e.g., mobile terminal, "smart phones," nomadic devices such as laptop PCs with wireless connectivity).

According to the RFC 3261, June 2002, SIP is an application layer protocol for establishing, terminating and modifying multimedia sessions. "SIP: Session Initiation Protocol", RFC 3261, June 2002. SIP communications are typically carried over IP protocols and IP networks. Telephone calls are considered a type of multimedia sessions where just audio is exchanged.

ISUP is a level 4 protocol used on traditional switched telephone (SS7) networks. ISUP communications are typically carried over MTP, although such communications can also run over an IP network. "Application of the ISDN user part of CCITT signaling system No. 7 for international ISDN interconnections," ITU-T Q.767 recommendation, February 1991. ISUP is used for controlling telephone calls and for maintenance of the network blocking circuits, resetting circuits, and other network equipment.

There are several flavors of ISUP. ITU-T Q.767 International ISUP is used through this document; some differences with ANSI ISUP ("Signaling System No. 7; ISDN User Part" T1.113-1995 ANSI, January 1995) and TTC ISUP are outlined. ISUP Q.767 is the least complex of all the ISUP flavors. Due to the small number of fields that map directly from ISUP to SIP, the signaling differences between Q.767 and specific national variants of ISUP will generally have little to no impact on the mapping. It should be noted that the ITU-T has not substantially standarized practices for Local Number Portability since portability tends to be grounded in national numbering plan practices, and that consequently LNP must be described on a virtually per-nation basis.

The manner of mapping between two signaling protocols: the Session Initiation Protocol (SIP) and the ISDN User Part (ISUP) of SS7 is described in Q.1912.5 Profile C and, RFC 3398, December 2002, which focuses on the translation of ISUP messages into SIP messages, and the mapping of ISUP parameters into SIP headers, and vice versa.

A module performing the mapping between these two protocols is usually referred to as Media Gateway Controller (MGC), although the terms 'softswitch' or 'call agent' are also sometimes used. An MGC has logical interfaces facing both networks, the network carrying ISUP and the network carrying SIP. The MGC also has some capabilities for controlling the voice path. There is typically a Media Gateway (MG) with E1/T1 trunking interfaces (voice from PSTN) and with IP interfaces (VoIP). The MGC and the MG can be merged together in one physical box or kept separate.

The Mapping between SIP headers and ISUP parameters in RFC 3398, December 2002, focuses largely on the mapping between the parameters found in the ISUP Initial Address Message (IAM) and the headers associated with the SIP INVITE message. Both of the IAM and SIP INVITE messages are used in their respective protocols to request the establishment of a call. Once an INVITE has been sent for a particular session, such headers as the To and From field become essentially fixed, and no further translation will be required during subsequent signaling, which is routed in accordance with Via and Route headers. Hence, the problem of parameter-to-header mapping in SIP-T is confined mostly to the IAM and the INVITE. There are other mappings that are important as well such as the mapping of Address Complete Message and Call Progress Messages to SIP 18× response messages. Q.1912.5 defines details on the mapping between ISUP and SIP in various scenarios and configurations.

The population of parameters in the ISUP ACM and REL messages based on SIP status codes is addressed in RFC 3398, December 2002, which also describes when the media path associated with a SIP call is to be initialized, terminated, modified. This RFC does not, however, go into details about how the initialization is performed or which protocols are used for that purpose.

A "loop condition" arises during initialization of a call across the ISUP/SIP boundary interface where a telephone call is routed repeatedly between the ISUP and SIP domains with a non-decrementing hop counter. This condition results in the same telephone call being processed indefinitely. If the "loop condition" is not broken, system resources will continue to be consumed on a telephone call that cannot be connected, instead of dropping the attempted telephone connection. What is needed is a method of breaking this "loop condition" and break the cycle of providing the same (or higher) parameter values between networks at the network boundary for an uncompleted telephone connection.

SUMMARY OF THE INVENTION

The present invention provides a solution to prevent a "loop condition" that can arise at the interface boundary of two telephone networks, known by their standard names ISUP and SIP networks. By adjusting parameter values, known as Hop Counter (ISUP) and Max-Forward (SIP), in a predetermined manner, the present invention prevents the situation where a failed connection continues to be processed because the same parameter values are repeatedly provided between networks at the network boundary interface, also called a "loop condition."

The present invention solves the "loop condition" by adjusting the Hop Counter and Max-Forward parameter values in a predetermined manner such that the adjusted parameter values break the cycle of providing the same parameter values between networks at the network boundary for an uncompleted connection, or break an endless "loop condition."

BRIEF DESCRIPTION OF THE DRAWINGS

Embodiments of the present application will now be described, by way of example only, with reference to the accompanying drawing figures, wherein.

DETAILED DESCRIPTION OF THE PREFERRED EMBODIMENTS

Figure 1:
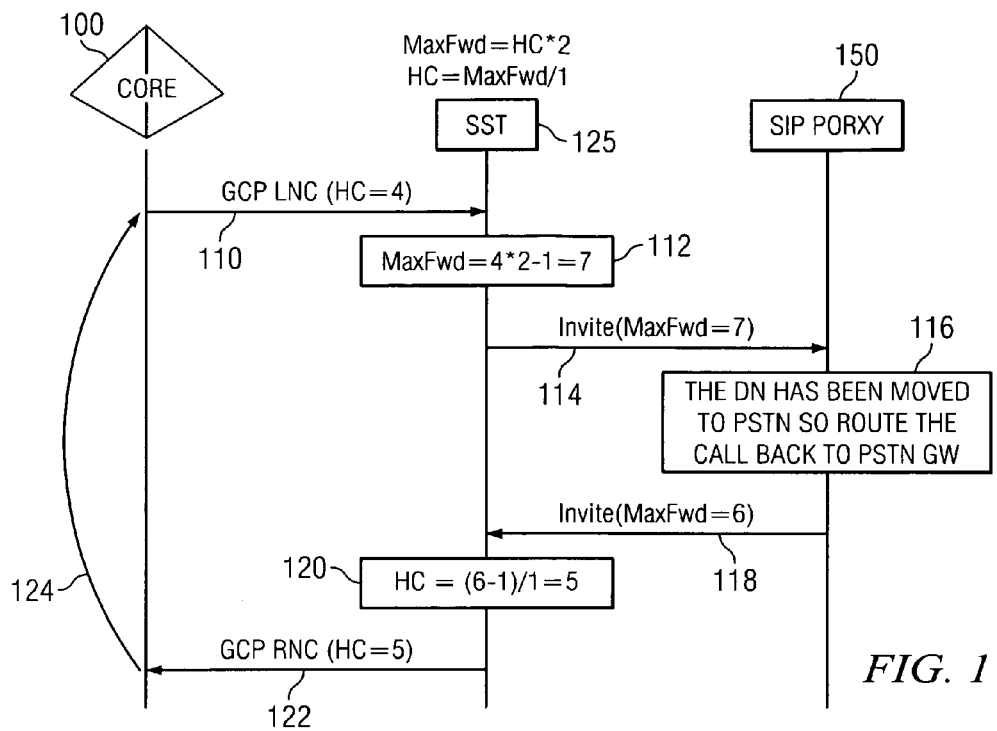
FIG. 1 is a figure showing the "loop condition" problem with system components.

The present invention focuses on the adjustment of parameter values used in the transition protocol described in Interworking per ITU-T Recommendation Q.1 912.5. The parameters include the ISUP Hop Counter and the SIP Max-Forwards Header.

The ISUP Hop Counter is designed for prevention of the loop condition on the SST network. The Hop Counter value is set by the originating exchange to a value of 1 to 31 (there should be a default value, e.g., 20), and it is decremented by 1 by each intermediate exchange unless hop counter is not activated for the outgoing trunk. The Hop Counter value should never increase for a call with each intermediate exchange. Forwarded calls are treated as a new origination and gets a new Hop Counter value, and the terminating office ignores the hop counter since the call is terminated at that location. In the situation where a call goes unconnected to its termination point after the number of Hop Counter reaches zero, the call is cleared from the system.

The loop condition occurs when a call goes unconnected to its termination point, but the system continues to use system resources to continue to try and indefinitely connect the call by transitioning the call among intermediate nodes on the system. When a call is received by an intermediate node, the node examines the Hop Counter value for the call received by the intermediate node. If the Hop Counter value is a positive number, the call will be transferred (with a Hop Counter decremented by one) to the next node or termination point. If the Hop Counter has reached zero because the call has been transitioned across the Hop Counter number of intermediate nodes without being connected to the intended termination point, the intermediate node will clear the call from the system because it will be considered an unconnectable call.

Thus, if the Hop Counter value reaches zero from the value it was given by the originating exchange, the system components or intermediate nodes that examine the Hop Counter will assume that the call should be cleared from the system because it is not capable of being connected to its intended termination point within a reasonable number of hops. In this manner, the value set for the Hop Counter value prevents a loop condition by setting an upper limit on the number of intermediate node transitions a call can make before being cleared by the system as an unconnectable call. Loop condition problems are thereby prevented on the ISUP network by the Hop Counter and this upper limit of transitions a call can make on the system.

The SIP Max-Forward header operates in much the same way to prevent loop conditions. The SIP Max-Forward header is set by an originating UAC (e.g., PSTN GW, or SIP client), and it has a valid value range: 0-255. RFC 3261 recommends a default value of 70. The SIP Max-Forward value is decremented by one at each node in the path.

The loop condition on the SIP system occurs when a SIP call goes unconnected to its termination point, but the system continues to use system resources to continue to try and indefinitely connect the call by transitioning the call among intermediate nodes on the system. When a call is received by each node on the SIP system, the node examines the Max-Forward value for the call received by the node. If the Max-Forward value is a positive number, the call will be transferred (with a Max-Forward decremented by one) to the next node or termination point. If the Max-Forward value has reached zero because the call has been transitioned across the Max-Forward number of nodes without being connected to the intended termination point, the call will be cleared from the system because it will be considered an unconnectable call.

Thus, if the Max-Forward value reaches zero from the value it was given by the originating exchange, the system components or intermediate nodes that examine the Max-Forward will assume that the call should be cleared from the system because it is not capable of being connected to its intended termination point within a reasonable number of hops. In this manner, the value set for the Max-Forward value prevents a loop condition by setting an upper limit on the number of intermediate node transitions a call can make before being cleared by the system as an unconnectable call. Loop condition problems are thereby prevented on the SIP network by the Max-Forward and this upper limit of transitions a call can make on the system.

When a call transitions from the ISUP network to the SIP network, the Hop Count value needs to be mapped over to a Max-Forward value. In like manner, when a call transitions from the SIP network to the ISUP network, the Max-Forward value needs to be mapped over to a Hop Count value. This mapping is governed by Interworking per ITU-T Recommendation Q.1912.5, with preset formulas to make the mapping of these parameter values. For ISUP to SIP, the mapping equation is "Max-Forwards=integer portion of (Factor*Hop-counter)" where Factor is a predetermined number. For SIP to ISUP, the mapping equation is "Hop-counter=integer portion of (Max-Forwards/Factor)" where Factor is a predetermined number. In this manner, a call that is transitioned over an interworking network boundary (ISUP/SIP) will carry with it the necessary Hop Count or Max-Forward value so that the "loop condition" does not occur.

When the transition occurs and the formulas are applied, an SIP Max-Forward value will be bigger than the ISUP Hop Counter when mapping from ISUP to SIP direction. Also, when the transition occurs and the formulas are applied, the ISUP Hop Counter resulted from mapping equation must not be significantly smaller to a point where the hop counter will lead to calls being frequently cleared due to too many hops. With respect to the Factor used in the mapping equations, the Factor used in the different mapping equations may be different. That is, one proposed mechanism for addressing the mapping equations for the Hop Count to Max Forward, or vice versa, values, is for the ISUP to SIP and SIP to ISUP mapping equations to use two different factors, e.g., a smaller factor for SIP to ISUP direction.

There is a problem with using the established transition equations, because some originating exchanges sets the initial Hop Counter value to a too small value, which causes call failure when the factor X is set to 1. The root cause of this problem is that the SIP network introduces more hops that a typical TDM network does and the TDM originating switch is not aware of this situation. The typical solution is to compensate for this by multiplying the Hop Counter value with a factor (greater than 1). The SST uses the same factor for both directions to prevent SST from becoming a looping point. If the factor is set to a bigger value, e.g., 2, then the SIP to ISUP direction may have issues since this brings down the Hop Counter value for SIP to ISUP direction significantly.

This problem is illustrated in the situation shown in FIG. 1, where a call is transitioned back and forth across the ISUP/SIP network boundary, but the mapping equations prevent to decrement of the Hop Count and Max Forward values with each loop of the call across the interfaces.

In FIG. 1, the Core network 100 is coupled to the ISUP SST network 125, which is coupled to the SIP Proxy network 150. The mapping equation for SIP to ISUP is "MaxFwd=HC*2," and the mapping equation for SIP to ISUP is "HC=MaxFwd/1." The mapping equations are performed at the ISUP and SIP Interworking UNIT SST 125. Hop Count value of 4 is received in step 110 at the SST 125, and the mapping equation produces a MaxFwd value of 8, which decremented by 1 because of the intermediate hop counted at the SST 125.

This results in the MaxFwd value of 7 shown in 112, and forwarded to the SIP Proxy network 150 in step 114. The SIP Proxy network 150 notices that the transitioned call destination has moved to the PSTN network at step 116, which is back on SST network 125. So, the MaxFwd value is decremented by one to account for the SIP Proxy network 150 as an intermediate node, and the call is sent back to the SST network 125 with a MaxFwd value of 6 at step 118.

The SST network 125 takes the MaxFwd value, decrements it by one to account for the SST network 125 as an intermediate hop, and performs the mapping equation "HC=MaxFwd/1" at step 120. This mapping equation results in a Hop Count value of 5. The call is transitioned to the Core network 100 in step 122, where the Core network 100 decrements the Hop Count value by one in step 124, to produce a Hop Count value of 4.

Based on the analysis of the call on the Core network 100, the call is shown to be destined to a location on the SIP Proxy network 150, so the Core Network 100 routes the call back to the SST network 125 with the Hop Count value of 4 in step 100. As can be readily recognized, this is the same Hop Count value as the previous step 100, and even though the call is obviously unconnectable, the mapping equations and transitions over the network interface boundaries is producing an infinite loop condition that will continue to consume network resources without end.

The present invention prevents this type of interworking loop condition by having an intelligent factor (i.e., an algorithm) that converts the ISUP Hop Counter to SIP Max-Forwards in such a way that the loop condition prevention mechanism is not broken and yet the number of hops/segments a call is allowed to traverse is significantly improved. The algorithm can be tweaked to form different variants (embodiments). The invention allows a bigger "factor" to be applied for ISUP to SIP direction than SIP to ISUP direction.

The present invention uses one or more mapping equation algorithms on the system components to produce a high "gain" when converting between ISUP Hop Counter and SIP Max-Forward so as to minimize the chances of calls failing when transitioning between ISUP and SIP. And, the present invention uses one or more mapping equation algorithms on the system components that have an intelligent factor that will guarantee the Hop Counter, or Max-Forwards value, will always decrease by at least one, even if taking the shortest possible loop back to the other network so as to guarantee that we will never have infinite loops.

The present invention uses one or more mapping equation algorithms on the system components to calculate the maximum value for the SIP Max-Forwards based on ISUP Hop Counter, ISUP to SIP conversion factor, and SIP to ISUP conversion factor in such a way that if the call would loop back from the SIP to ISUP, the resulting ISUP hop counter to the interworking unit would be at least one less than the original hop counter value hence preventing an infinite loop. The present invention uses mapping equation algorithms that calculates the Max-Forward value by taking the reverse mapping factor into consideration.

The present invention uses one or more mapping equation algorithms on the system components that calculate the Max-Forward value by giving a constant gain for one direction. For example, in the ISUP to SIP direction, the mapping equations used on the system components adds an incremental 4 to the resulted Max-Forwards value, and decrements the Max-Forward value by 4 before converting to ISUP Hop Counter for SIP to ISUP direction. The idea of combining the various aspects discussed above into one set of mapping algorithms to be used on the system components results in artificially decrementing a number of hops from the Hop Counter after applying the SIP to ISUP conversion factor so that the equal amount of hops can be added to the ISUP to SIP conversion direction, which addresses the typical issue of the SIP Max-Forwards value being too low when the incoming Hop Counter value is too small.

The present invention uses one or more mapping equation algorithms on the system components to customize the algorithm based on certain known facts such as the next node will not loop back immediately hence the maximum value of the SIP Max-Forwards value can be bigger. The idea of calculating the maximum Max-Forwards value by first figuring out the minimal Max-Forwards value that would cause a loop and then output the max-forwards value being (the minimal max-forwards value −1). The present invention uses one or more mapping equation algorithms on the system components to use the same algorithm for all the interworking units in the network, as well as activate an algorithm for all the interworking units in the network at once to minimize failures. Ultimately, the goal is to produce a bigger Max-Forwards value if the next node will not loop back or to calculate the Max-Forwards value by taking the minimal loop length into consideration, but achieve a Max-Forwards value that will allow an unconnectable call to terminate based on the use of an intelligent mapping equation.

On top of the known mapping equations, the present invention uses the following equation to produce a bigger Max-Forward value and make sure the Max-Forward value does not drop below a predetermined small value. The present invention uses the following equation for the ISUP to SIP direction:

$$\text{Max-Forwards} = \text{MIN}(255, \text{MIN}((((HC1+1)*F2+2)-1), (F1*HC1-1))+G)$$

where:
 HC1 is the incoming Hop Counter value to the interworking unit,
 F2 is the factor used to calculate the ISUP hop counter based on SIP max-forwards value,
 F1 is the factor used to calculate the SIP Max-Forwards value based on ISUP Hop Counter,
 G is a predetermined directional gain factor added to the second part of the equation.

The directional gain G is a factor between 0 to 5, which provides adjustment of the algorithm based on deployment needs. A bigger G value produces bigger SIP Max-forwards value for ISUP to SIP direction but produces smaller value for HC for the SIP to ISUP direction.

Figure 2:
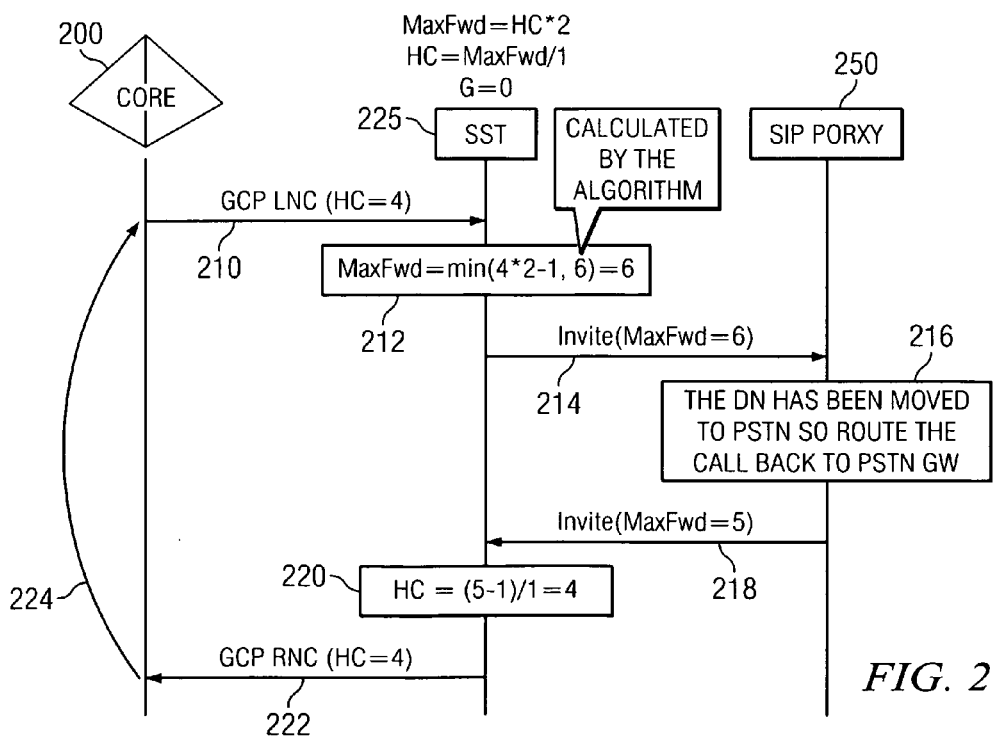
FIG. 2 is a figure showing the use of the algorithm in the system components.

In an example shown in FIG. 2, the F1 factor is 2 and the F2 factor is 1. In FIG. 2, the Core network 200 is coupled to the SST network 225, which is coupled to the SIP Proxy network 250. The mapping equation for SIP to ISUP is shown above using the minimum of the ((HC1+1)*F2+2)-1) or (F1*HC1-1). The mapping equations are performed at the SST network 225. The first part of the minimum equation is (((4+1)*1)+2)-1), or (((5*1)+2)-1), or (7-1), or 6. The second part of the minimum is (2*4)-1, or 8-1, or 7. The minimum of 6 and 7 is 6. As such, a Hop Count HC1 value of 4 received in step 210 at the SST network 225, results in a mapping equation Minimum MaxFwd value of 6 at step 212, which forwarded to the SST network 225 in step 214.

This results in the MaxFwd value of 6 shown in 212, and forwarded to the SIP Proxy network 250 in step 214. The SIP Proxy network 250 notices that the transitioned call destination has moved to the PSTN network at step 216, which is back on SST network 225. So, the MaxFwd value is decremented by one to account for the SIP Proxy network 250 as an intermediate node, and the call is sent back to the SST network 225 with a MaxFwd value of 5 at step 218.

The SST network 225 takes the MaxFwd value of 5, decrements it by one to account for the SST network 225 as an intermediate hop, and performs the mapping equation "HC=MaxFwd/1" or "4/1" at step 220. This mapping equation results in a Hop Count value of 4. The call is transitioned to the Core network 200 in step 222, where the Core network 200 decrements the Hop Count value by one in step 224, to produce a Hop Count value of 3.

Figure 3:
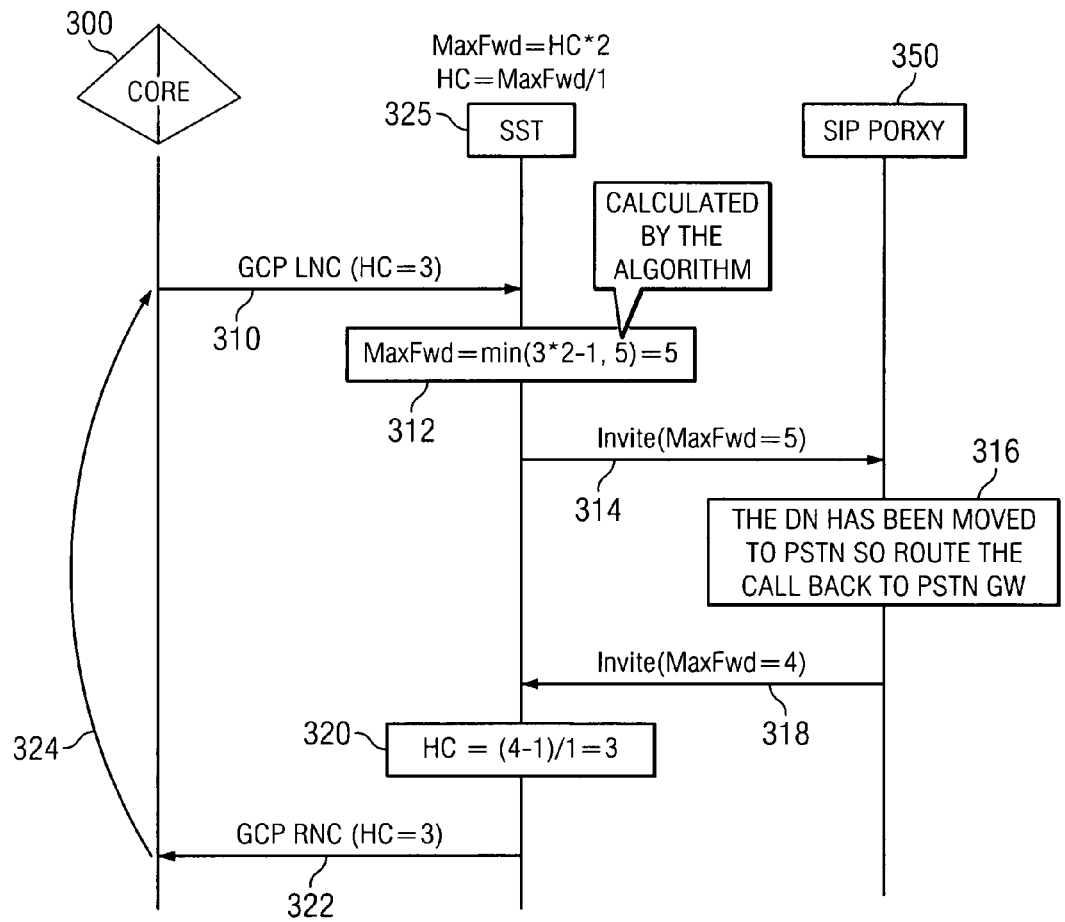
FIG. 3 is a figure showing the avoidance of the "loop condition" problem using the invention on the system components; and, FIG. 4 is a figure showing the avoidance of the "loop condition" problem using the invention on the system components.

Based on the analysis of the call on the Core network 200, the call is shown to be destined to a location on the SIP Proxy network 250, so the Core Network 200 routes the call back to the SST network 225, but this time with the Hop Count value of 3 in step 310 shown in FIG. 3 sent from Core Network 300. This is a smaller Hop Count value than was sent out in FIG. 2 at step 210, which means the Hop Count value is decreasing.

As shown in FIG. 3 on the next loop, the Minimum mapping equation for SIP to ISUP using HC1=3 and the mapping equation shown above will produce the minimum of the ((HC1+1)*F2+2)-1) or (F1*HC1-1). The mapping equations are performed at the SST network 225. The first part of the minimum equation is (((3+1)*1)+2)-1), or (((4*1)+2)-1), or (6-1), or 5. The second part of the minimum is (2*3)-1, or 6-1, or 5. The minimum of 5 and 5 is 5. As such, a Hop Count HC1 value of 3 received in step 310 at the SST network 325, results in a mapping equation Minimum MaxFwd value of 5 in step 312, which is forwarded to the SST network 325 in step 314.

This results in the MaxFwd value of 5 shown in 312, and forwarded to the SIP Proxy network 350 in step 314. The SIP Proxy network 350 notices that the transitioned call destination has moved to the PSTN network at step 316, which is back on SST network 325. So, the MaxFwd value is decremented by one to account for the SIP Proxy network 350 as an intermediate node, and the call is sent back to the SST network 325 with a MaxFwd value of 4 at step 318.

The SST network 325 takes the MaxFwd value of 4, decrements it by one to account for the SST network 325 as an intermediate hop, and performs the mapping equation "HC=MaxFwd/1" or "3/1" at step 220. This mapping equation results in a Hop Count value of 3. The call is transitioned to the Core network 300 in step 322, where the Core network 300 decrements the Hop Count value by one in step 324, to produce a Hop Count value of 2 that is transitioned back to the SST network 325. This is a smaller Hop Count value than was sent out in FIG. 2 at step 210, which means the Hop Count value is decreasing—and will continue to decrease until it reaches zero and the call is cleared from the system as being unconnectable. In this manner, any loop condition arising at the network interface boundary will be broken by the present invention, and system resources will be conserved over prior art systems.

The present invention uses the following equation for the SIP to ISUP mapping direction:

$$\text{Hop Count} = \text{MIN}(31, \text{INT}(\text{MAX}(0, (MF2-1-G))/F2))$$

where:
 MF2 is the incoming MaxForward value from the SIP network,
 F2 is the factor used to calculate the ISUP hop counter based on SIP max-forwards value,
 G is a predetermined directional gain factor added to the second part of the equation.

This equation will also assist with breaking any loop condition by reducing the Hop Count value with each successive loop in a transition of calls over the interworking network boundary interface. Ultimately, the goal is to reduce the Hop Count value to zero in this condition, so that the unconnectable call can be cleared from the system.

The above-described embodiments of the present application are intended to be examples only. Those of skill in the art may effect alterations, modifications and variations to the particular embodiments without departing from the scope of the application. In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for preventing a loop condition on a network boundary interface between a plurality of telephone networks, comprising the steps of:
 receiving at a first network server on a first network a first call parameter value associated with a first telephone call, said first call parameter value being a predetermined number of remaining transmissions of the first telephone call to one or more nodes that will be permitted before the first telephone call is cleared from the system as an unconnectable telephone call;

generating a second call parameter value associated with the first telephone call using the first call parameter value, said second call parameter value is a parameter that will be used on a second network to determine the remaining transmissions of the first telephone call to one or more nodes that will be permitted before the first telephone call is cleared from the system as an unconnectable telephone call;

receiving at the first network server on the first network a third call parameter value associated with the first telephone call as calculated using the second call parameter value, said third call parameter value being less than the first call parameter value and said third call parameter value being a number of remaining transmissions of the first telephone call to one or more nodes that will be permitted before the first telephone call is cleared from the system as an unconnectable telephone call;

said second call parameter value being calculated using an intelligent factor that will assure a decrease by at least one in the call parameter values even if the telephone call takes the shortest possible loop back to the first server on the first network so as to break any loop condition.

2. The method of claim 1 wherein the calculation of the second call parameter at the first server on the first network uses a larger factor than factors applied to determine other call parameter values.

3. The method of claim 1 wherein the calculation of the second call parameter at the first server on the first network produces a high "gain" in that parameter value so as to minimize the chances of calls failing when transitioning away from the first network.

4. The method of claim 1 wherein the calculation of the second call parameter at the first server on the first network is based on a conversion factor set so as to prevent an infinite loop condition.

5. The method of claim 1 wherein the calculation of the second call parameter at the first server on the first network is based on a reverse mapping factor.

6. The method of claim 1 wherein the calculation of the second call parameter at the first server on the first network is based on consideration of minimal loop length.

7. The method of claim 1 wherein the calculation of the second call parameter at the first server on the first network is based on the equation:

$$\text{Max-Forwards}=\text{MIN}(255, \text{MIN}((((HC1+1)*F2+2)-1),(F1*HC1-1))+G),$$

where:
HC1 is the incoming Hop Counter value to the interworking unit,
F2 is the factor used to calculate the ISUP hop counter based on SIP max-forwards value, 1 is the factor used to calculate the SIP Max-Forwards value based on ISUP Hop Counter, and,
G is a predetermined directional gain factor added to the second part of the equation.

8. The method of claim 7 wherein the directional gain G is a value between 0 to 5.

9. The method of claim 1 wherein the calculation of the second call parameter at the first server on the first network is based on the equation:

$$\text{Hop Count}=\text{MIN}(31,\text{INT}(\text{MAX}(0,(MF2-1-G))/F2))$$

where:
MF2 is the incoming Max-Forwards value from the SIP network,
F2 is the factor used to calculate the ISUP hop counter based on SIP max-forwards value,
G is a predetermined directional gain factor added to the second part of the equation.

10. The method of claim 9 wherein the directional gain G is a value between 0 to 5.

11. A transmission system that prevents a loop condition on a network boundary interface between a plurality of telephone networks, the system comprising:

a first network server on a first network, said network server receives a first call parameter value associated with a first telephone call, said first call parameter value being a predetermined number of remaining transmissions of the first telephone call to one or more nodes that will be permitted before the first telephone call is cleared from the system as an unconnectable telephone call;

said first network server generates a second call parameter value associated with the first telephone call using the first call parameter value, said second call parameter value is a parameter that will be used on a second network to determine the remaining transmissions of the first telephone call to one or more nodes that will be permitted before the first telephone call is cleared from the system as an unconnectable telephone call;

said first network server receives a third call parameter value associated with the first telephone call as calculated using the second call parameter value, said third call parameter value being less than the first call parameter value and said third call parameter value being a number of remaining transmissions of the first telephone call to one or more nodes that will be permitted before the first telephone call is cleared from the system as an unconnectable telephone call;

said second call parameter value being calculated using an intelligent factor that will assure a decrease by at least one in the call parameter values even if the telephone call takes the shortest possible loop back to the first server on the first network so as to break any loop condition.

12. The transmission system of claim 11 wherein the calculation of the second call parameter at the first server on the first network uses a larger factor than factors applied to determine other call parameter values.

13. The transmission system of claim 11 wherein the calculation of the second call parameter at the first server on the first network produces a high "gain" in that parameter value so as to minimize the chances of calls failing when transitioning away from the first network.

14. The transmission system of claim 11 wherein the calculation of the second call parameter at the first server on the first network is based on a conversion factor set so as to prevent an infinite loop condition.

15. The transmission system of claim 11 wherein the calculation of the second call parameter at the first server on the first network is based on a reverse mapping factor.

16. The transmission system of claim 11 wherein the calculation of the second call parameter at the first server on the first network is based on consideration of minimal loop length.

17. The transmission system of claim 11 wherein the calculation of the second call parameter at the first server on the first network is based on the equation:

$$\text{Max-Forwards}=\text{MIN}(255,\text{MIN}((((HC1+1)*F2+2)-1),(F1*HC1-1))+G)$$

where:
HC1 is the incoming Hop Counter value to the interworking unit,

F2 is the factor used to calculate the ISUP hop counter based on SIP max-forwards value, F1 is the factor used to calculate the SIP Max-Forwards value based on ISUP Hop Counter, and, G is a predetermined directional gain factor added to the second part of the equation.

18. The transmission system of claim 17 wherein the directional gain G is a value between 0 to 5.

19. The transmission system of claim 11 wherein the calculation of the second call parameter at the first server on the first network is based on the equation:

Hop Count=MIN(31,INT(MAX(0,($MF2-1-G$))/$F2$))

where:

MF2 is the incoming Max-Forwards value from the SIP network,

F2 is the factor used to calculate the ISUP hop counter based on SIP max-forwards value, G is a predetermined directional gain factor added to the second part of the equation.

20. The transmission system of claim 19 wherein the directional gain G is a value between 0 to 5.

21. A method for preventing a loop condition on a network boundary interface between a plurality of telephone networks, the method comprising:

receiving, at a server, a telephone call transitioning from a first telecommunication network to a second telecommunication network different from the first telecommunication network, the telephone call being associated with a first decrementing counter that indicates a maximum number of hops before the telephone call is cleared as unconnectable from the first telecommunication network;

calculating a second decrementing counter for the second telecommunication network, the second decrementing counter indicating a maximum number of hops before the telephone call is cleared as unconnectable from the second telecommunication network , wherein calculating the second decrementing counter includes:

calculating a maximum value for the second decrementing counter using a value of the first decrementing counter that was received at the server so that when the telephone call is routed back from the second telecommunication network to the first telecommunication network, a subsequent recalculated value of the first decrementing counter would be at least one less than the value of the first decrementing counter that was received at the server; and routing the telephone call from the server to a node in the second network, the telephone call being associated with the second decrementing counter.

22. The method of claim 21, wherein the first network comprises a switched telephone network, and wherein the second network comprises an Internet Protocol (IP)-based network handling the telephone call as a multimedia session.

23. The method of claim 22, wherein the first network supports ISDN User Part (ISUP), and wherein the second network supports Session Initiation Protocol (SIP).

24. The method of claim 21 wherein calculating a maximum value for the second decrementing counter employs the following equation:

second decrementing counter=MIN(255,MIN($HC1$+1)*$F2$+2)-1),($F1$*$HC1$-1))+$G$)

where:

HC1 is the value of the first decrementing counter that was received at the server, F2 is a conversion factor used to calculate a value of the first decrementing counter based on a value of the second decrementing counter, F1 is a conversion factor used to calculate a value of the second decrementing counter based on the first decrementing counter, and G is a constant.

25. The method of claim 21, further comprising:

receiving, at the server, the telephone call being routed back from the second telecommunication network to the first telecommunication network;

recalculating the first decrementing counter based on the following equation:

first decrementing counter=MIN(31,INT(MAX(0,($MF2-1-G$))/$F2$)) where:

MF2 is a value of the second decrementing counter received at the server when the telephone call is routed back from the second telecommunication network, F2 is a conversion factor used to calculate a value of the first decrementing counter based on a value of the second decrementing counter, and G is a constant.

* * * * *